(12) United States Patent
Frenzel (10) Patent No.: US 8,424,841 B2
(45) Date of Patent: Apr. 23, 2013

(54) MULTI-COMPONENT METAL SEAT DESIGN FOR BALL VALVES

(75) Inventor: Robert Anthony Frenzel, Waller, TX (US)

(73) Assignee: Bray International, Inc., Houston, TX (US)

( * ) Notice: Subject to any disclaimer, the term of this patent is extended or adjusted under 35 U.S.C. 154(b) by 419 days.

(21) Appl. No.: 12/725,209

(22) Filed: Mar. 16, 2010

(65) Prior Publication Data
US 2010/0229962 A1 Sep. 16, 2010

Related U.S. Application Data

(60) Provisional application No. 61/160,573, filed on Mar. 16, 2009.

(51) Int. Cl.
*F16K 5/06* (2006.01)
(52) U.S. Cl.
USPC ... 251/180; 251/192; 251/315.03; 251/315.1; 251/314
(58) Field of Classification Search ............. 251/315.01, 251/315.03, 315.1, 314, 316, 317, 180, 192
See application file for complete search history.

(56) References Cited

U.S. PATENT DOCUMENTS

| | | | |
|---|---|---|---|
| 3,177,887 A | 4/1965 | Priese | |
| 4,217,923 A * | 8/1980 | Kindersley | 137/315.21 |
| 4,235,418 A | 11/1980 | Natalizia | |
| 4,280,522 A * | 7/1981 | Pechnyo et al. | 137/72 |
| 4,386,756 A | 6/1983 | Muchow | |
| 4,566,482 A * | 1/1986 | Stunkard | 251/315.08 |
| 4,658,847 A * | 4/1987 | McCrone | 137/72 |
| 4,899,980 A | 2/1990 | Kemp | |
| 4,940,208 A | 7/1990 | Kemp | |
| 5,170,989 A * | 12/1992 | Kemp | 251/174 |
| 5,265,845 A * | 11/1993 | Gilliam | 251/163 |
| 5,313,976 A * | 5/1994 | Beasley | 137/15.22 |
| 5,419,532 A * | 5/1995 | Fan | 251/315.08 |
| 5,810,048 A * | 9/1998 | Zeiner-Gundersen | 137/614.04 |
| 6,082,707 A * | 7/2000 | Hosie et al. | 251/172 |
| 6,116,575 A | 9/2000 | Ahn | |
| 6,783,111 B2 * | 8/2004 | Cash et al. | 251/160 |
| 6,969,047 B2 * | 11/2005 | Hotton et al. | 251/315.13 |
| 6,988,709 B2 * | 1/2006 | Scaramucci | 251/315.14 |
| 7,249,751 B2 * | 7/2007 | Hall et al. | 251/214 |

* cited by examiner

FOREIGN PATENT DOCUMENTS

| | | |
|---|---|---|
| JP | 03-104568 | 10/1991 |
| JP | 07-055026 | 3/1995 |
| JP | 10-205637 | 8/1998 |
| JP | 11-082762 | 3/1999 |

OTHER PUBLICATIONS

Kwak, Seong Ryong, International Search Report and Written Opinion of the International Searching Authority, Oct. 22, 2010, 4 pages, Korean Intellectual Property Office, Republic of Korea.

*Primary Examiner* — John Bastianelli
(74) *Attorney, Agent, or Firm* — Mark A. Oathout; Oathout Law Firm (57) ABSTRACT

A floating ball valve has a metal multiple component seat installed in the seat pocket. The multiple component seat further includes a support ring and at least one seal element. The support ring and the seal element are juxtaposed and both are adjacent to the ball when the floating ball valve is in a closed position. The support ring is in a overlapping complimentary position with respect to the seal element, the seal element having greater elasticity than the support ring and the support ring having a greater load bearing strength than the seal element.

15 Claims, 8 Drawing Sheets

MULTI-COMPONENT METAL SEAT DESIGN FOR BALL VALVES

CROSS-REFERENCE TO RELATED APPLICATIONS

This application claims the benefit of U.S. Provisional Application No. 61/160,573 filed Mar. 16, 2009.

STATEMENTS REGARDING FEDERALLY SPONSORED RESEARCH OR DEVELOPMENT

Not Applicable.

NAMES OF THE PARTIES TO A JOINT RESEARCH AGREEMENT

Not Applicable.

REFERENCE TO A "SEQUENCE LISTING", A TABLE, OR A COMPUTER PROGRAM

Not Applicable.

BACKGROUND

Floating ball valves are a well known category of ball valves employing top entry and metal seat rings. Such ball valves generally have a valve body, a valve chamber, a ball or a generally spherical member positioned with the valve chamber, and one or two seat members positioned between the ball and the respective ends of the valve chamber. The ball may be rotated from and between an open position in which there is an internal flow path through the ball and through the chamber to a closed position in which the foregoing path is closed.

For the purpose of installing a metal seat, many ball valves must currently undergo an extensive modification process. This is not typical for production valves. This process involves modifying the valve body components to accept custom made and matched components. The re-manufacture of an existing valve thus becomes an expensive and time consuming process which increases the cost and lead time required to produce metal seated products. This has been the norm in the ball valve industry for many years.

Figure 1A:
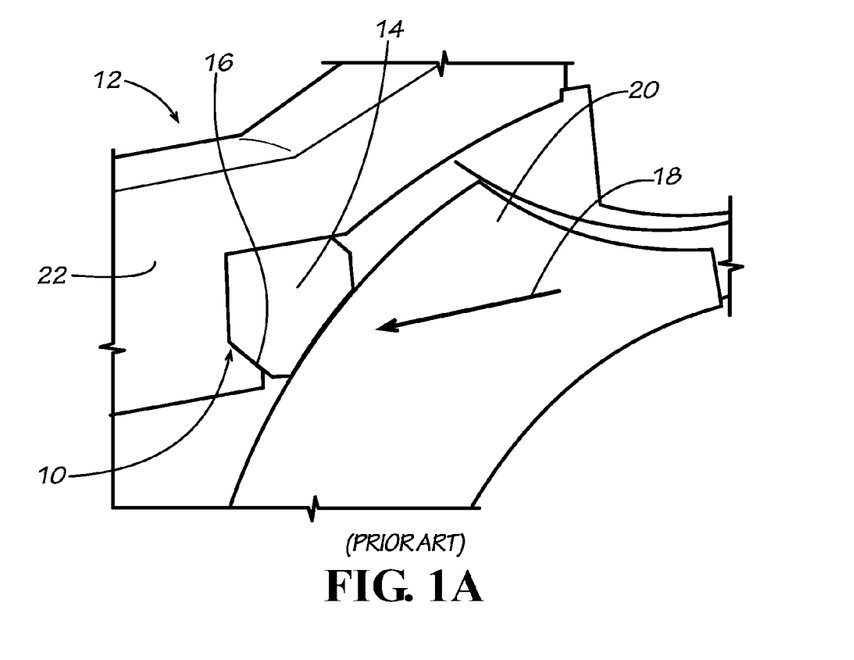
FIG. 1A is a sectional perspective view of a Prior Art ball valve.

Referring to FIG. 1A a prior art standard seat pocket 10 in a ball valve 12 is shown. This standard seat pocket 10 is designed for a polymer seat 14. A raised rim 16 around this seat pocket 10 serves as a fire safe seat when the polymer seat 14 is destroyed in a fire. The single piece polymer seat 14 supports the full pressure load (referenced by arrow 18) of the ball 20 and provides the seal between the body 22 and ball 20. The polymer seat material must therefore be sufficiently resistant to crushing forces to support the ball 20 under pressure while also having low friction characteristics, good chemical compatibility and good sealing ability. Very few materials have all of these desired properties, and that is without the considering the issue of durability of the polymer seat 14 under operational conditions.

'Metal seat' technology was developed to address some of the problems faced by polymeric seats, and especially at extreme temperature conditions. Typical 'metal seat' technology in use for prior art floating ball valves often requires one to carry out a cumbersome procedure. The procedure involves disassembling the valve, modifying the body components in the area of the seat pocket and then re-assembling the valve with carefully or precision lapped and matched parts.

Figure 1B:
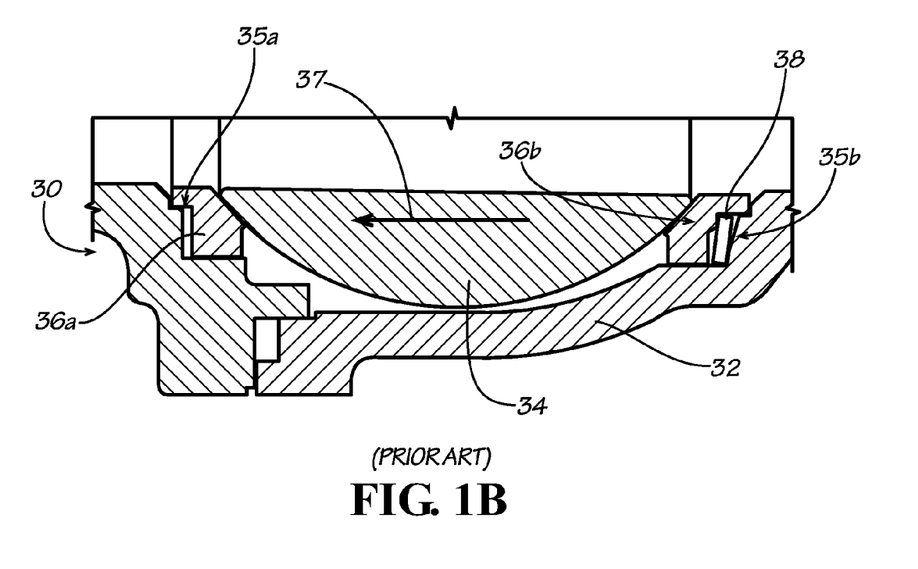
FIG. 1B is a sectional view of another Prior Art ball valve.

Referring to FIG. 1B a prior art floating ball valve 30 having custom fitted parts is shown. The valve 30 includes the body 32, ball 34, two seat rings 36a & 36b, a graphite gasket and an energizer spring 38. The body is re-machined in two primary areas 35a & 35b to accept the new style, retrofit seats 36a & 36b. The ball 34 and seat rings 36a & 36b are hand lapped to obtain a precision, leak free fit. The custom fitted parts are installed with back-up components such as the energizer spring 38. The resulting valve 30 is a uni-directional assembly (i.e. the flow direction for the retrofitted valve as represented by arrow 37 cannot be reversed). The modifications and custom fitting of parts adds significantly to the lead time which must be allotted and to the expense of the valve assembly. Such added time and expenses are the current norm in the metal seat floating ball valve industry.

Another problem encountered with prior art floating balls valves results for a lack of available products. Products simply are not available to retrofit or replace the existing components with off-the-shelf ball valve components at a lower cost than custom modifications would allow.

SUMMARY

A first objective is to implement standard product components and develop a "drop-in" replacement seat. When installed this 'metal seat' must be able to extend the operating temperature range of the ball valve to industry standards for an upper limit and/or a lower limit for cryogenic service. On a larger scale, chemical compatibility, operating temperature, ease of retrofit and economy of scale are all parameters which must be considered and accommodated in any design.

Furthermore, a seat in a floating ball valve must be capable of accomplishing several other design parameters. The first and most obvious is the provision of a seal between the ball and body which will block the flow of product through the valve. Several secondary, though no less important, functions are needed for successful operation. The seat must prevent the ball from moving (floating) off of the stem centerline by significant amounts otherwise excessive torque will become a problem. The seat must also center the ball well enough to provide even loading of the seal so that no local leakage occurs. This is important since the ability to seal is directly related to contact loading against the seat. The seat should also be capable of floating some small amount to best affect an even seal. The design should also maintain a nominal preload for sealing at low pressures.

Other objectives include the following. It is desirable to utilize the existing valve body without having to make any modifications and to avoid using expensive hand lapping or fitting as formerly used on the mating parts (ball and metal seat). The metal seat should be formed as a "drop-in" retrofit to replace a polymer seat. The metal seat should be functional at the industry standards for temperatures at the upper limits and/or at lower limits for cryogenic service. The metal seat should maintain less than the industry standard for permitted leakage throughout its useful life, in this case control valve leakage class IV. The torque requirement shall not exceed the present published metal seat values. In addition to all of the foregoing, it is quite desirable to significantly reduce the cost and lead time required to manufacture the metal seat by incorporating off-the-shelf parts whenever practical and possible.

A floating ball valve has a metal multiple component seat installed in the seat pocket. The multiple component seat further includes a support ring and at least one seal element, each serving separate individual functions. The support ring and the seal element are juxtaposed and both are adjacent to the ball when the floating ball valve is in a closed position. The support ring is in a overlapping complimentary position with respect to the seal element, the seal element having greater elasticity than the support ring and the support ring having a greater load bearing strength than the seal element.

DETAILED DESCRIPTION OF PREFERRED EMBODIMENT(S)

Figure 2:
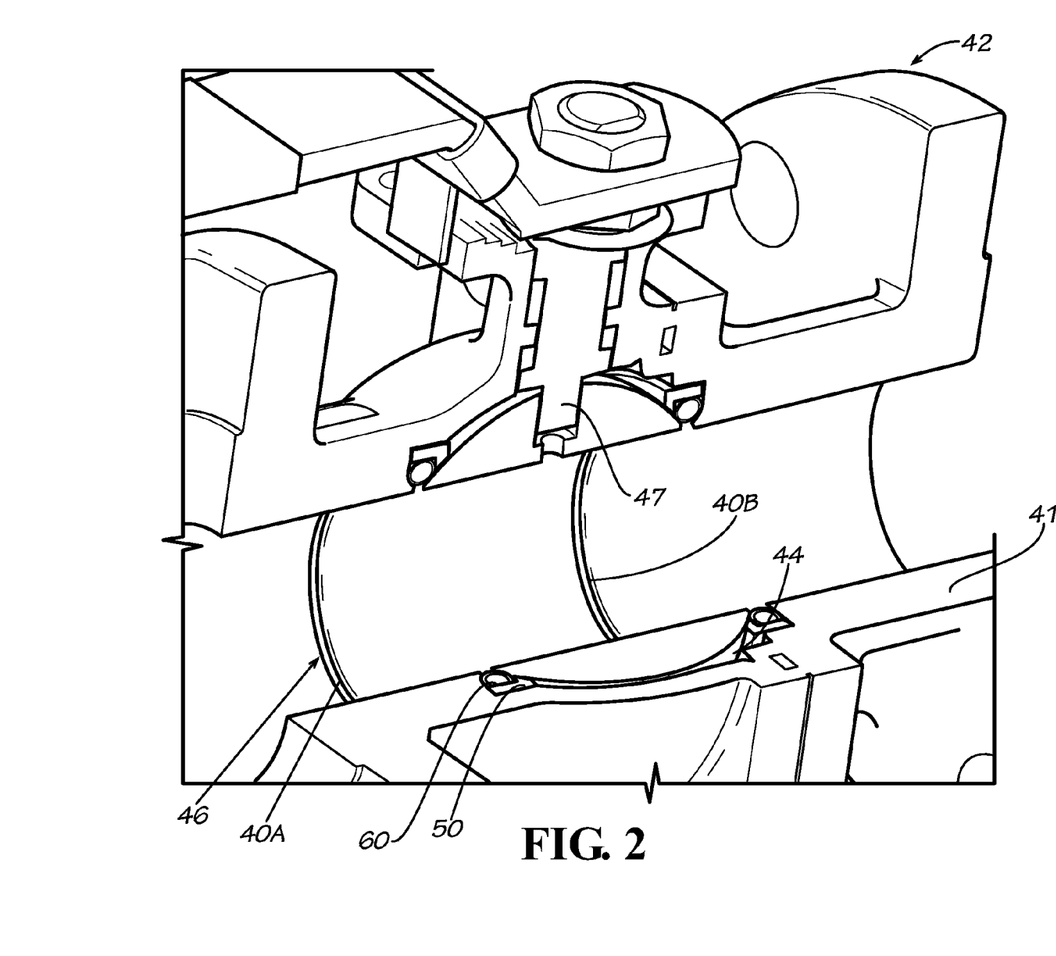
FIG. 2 is a schematic perspective view, partially in breakaway, of a floating ball valve with one embodiment of a multiple component seat.
Figure 3:
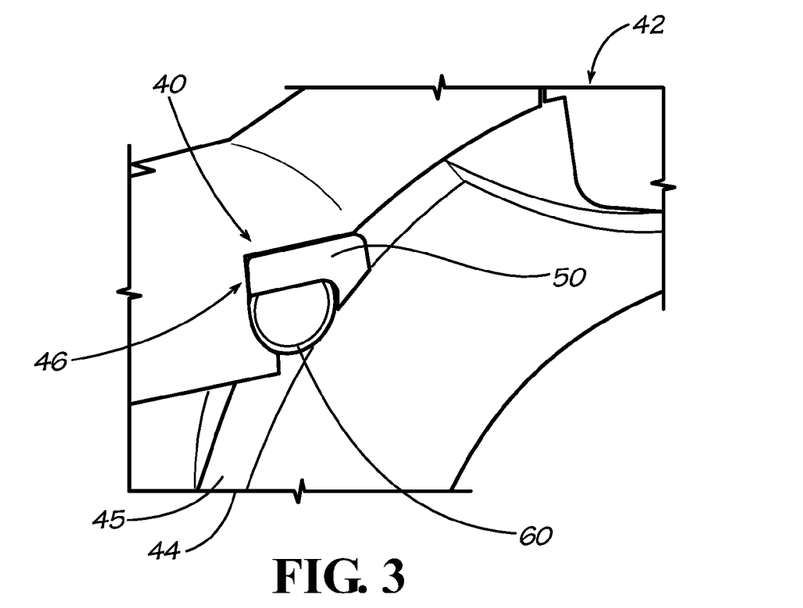
FIG. 3 is a sectional perspective view of one embodiment of a multiple component seat in a metal seated floating ball valve.

Referring to FIGS. 2-3 a basic embodiment of a multiple component seat 40 (referenced as 40a & 40b in FIG. 2 as two are shown) is represented. The multiple component seat 40 is a 'metal seat' to be implemented into a floating ball valve 42 having a stem 47, a valve body 41, and a seat pocket 46. The multiple component seat could also be implemented into a trunion ball valve (not shown). A support ring 50 is the first component. A seal element 60 is the second component. In this basic embodiment the support ring 50 and the seal element 60 make up the multiple component seat 40. The support ring 50 is juxtaposed with the seal element 60. Both elements 50 & 60 are adjacent to or abut the ball 44 when the ball 44 is moved to the "closed" position (as shown). The multiple component seat 40 is shaped to fit the annular seat pocket(s) 46 formed (either pre-existing, designed, or custom made) to receive the valve seat in the ball valve 42.

The support ring 50 and the seal element 60 are not required to be physically separate pieces as they may be integrants or formed as unitary constituents or components of the multiple component seat 40. The separate functions of pressure support and sealing can be accomplished with multiple components or separate design features within the same component in that the seal contact does not also support the ball pressure load. The support ring 50 and the seal element 60 are complementary. The support ring 50 functions to absorb or support the pressure or contact load delivered by the ball 44 such that this pressure load is primarily borne by the support ring 50 i.e. is not transferred to the seal element 60. In other words the contact load on the seal element 60 is reduced. Accordingly, the support ring 50 functions as a brace for the seal element 60. The seal element 60 functions to maintain flexibility and resiliency to facilitate the sealing function of the ball valve 42. The support ring 50 interacts with the seal element 60 to reduce the premature wear and failure of the seal element 60 as caused by contact loads. Accordingly, the support ring 50 and the seal element 60 as a whole function together to achieve a synergistically more sustainable 'metal seated' ball valve 42.

The support ring 50 supports the pressure load of the ball 44 and protects seal element 60 from the full pressure load of the ball 44. The support ring 50 is made from a material that works well at supporting loads but may not make a good, flexible seal. The support ring 50 has a relatively greater bearing material strength as compared to the seal element 60. In the embodiments shown the support ring 50 is relatively thicker walled in cross section (FIGS. 3 & 5) and has greater rigidity as compared to the seal element 60. The seal element 60 has relatively greater elasticity, may be made from a material that works well as a seal, and may be relatively thinner in cross-section (FIGS. 3 & 7) as compared to the support ring 50. The seal element 60 functions as a compression spring to store mechanical energy and "push" against the ball 44 when loaded by the ball 44. The seal element 60 is also adapted to seal against other surface(s) at the desired seal interface (e.g. in the seat pocket 46). Preferably, both the support ring 50 and the seal element 60 have low friction characteristics.

Figure 4:
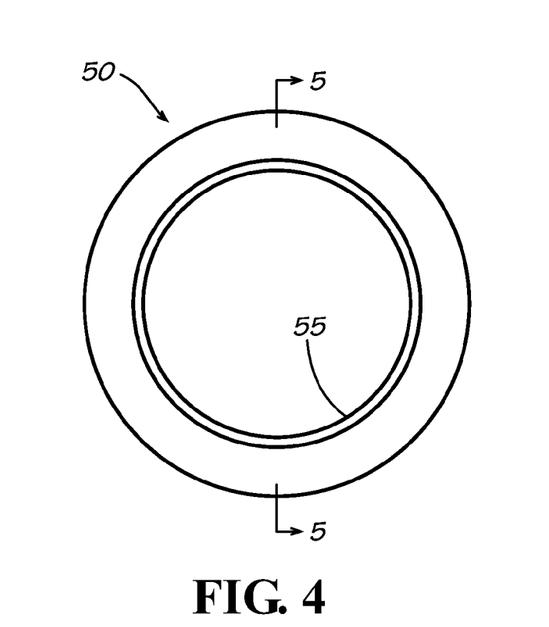
FIG. 4 is an end view of one embodiment of a support ring.
Figure 5:
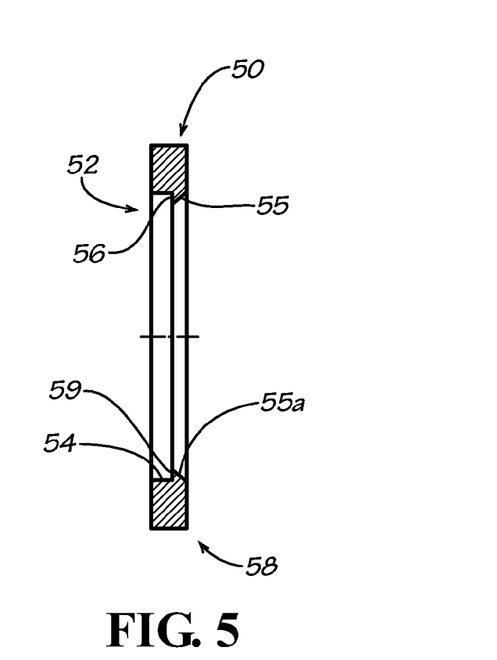
FIG. 5 is a sectional view taken along line 5-5 of FIG. 4.
Figure 5A:
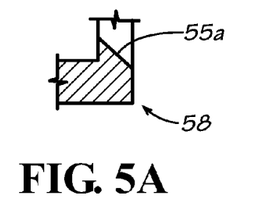
FIG. 5A is a sectional break-away view of one embodiment of a chamfered edge.
Figure 5B:
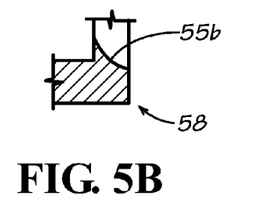
FIG. 5B is a sectional break-away view of another embodiment of a chamfered edge.
Figure 5C:
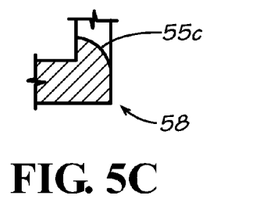
FIG. 5C is a sectional break-away view of another embodiment of a chamfered edge.

Referring to FIGS. 4-5, the support ring 50 of the embodiment of FIG. 3 is shown. Other embodiments of support rings may be implemented to complement the seal element 60 and to match the ball valve 42. The support ring 50 may be formed as a counter-bored annular piece 52 (such counter-boring forming inner surface 54 down to base surface 56). Accordingly, the support ring 50 in cross-section reveals a squared end or union region 58 (although the union region 58 may be formed with a radius 59). The edge 55 is chamfered to a conical surface 55a (FIG. 5A), a spherical surface 55b (FIG. 5B), or a toroidal surface 55c (FIG. 5C) for the purpose of supporting the ball 44. All embodiments of chamfered edges 55 should be machined to tangentially match the outer surface 45 of the ball 44. The chamfered edge 55 may also be lapped as known to one of ordinary skill in the art, if desired.

Figures 6, 7:
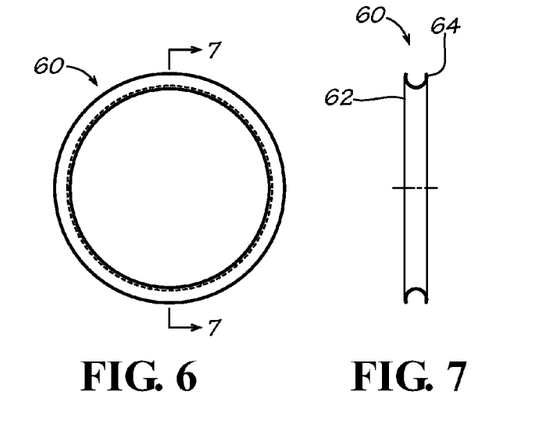
FIG. 6 is an end view of one embodiment of a seal element.
FIG. 7 is a sectional view taken along line 7-7 of FIG. 6.
Figure 7A:
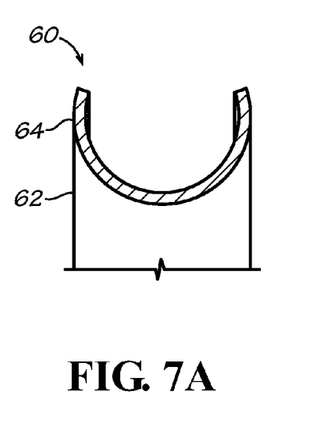
FIG. 7A is a detail break-away view taken from FIG. 7.

Referring to FIGS. 6-7, the seal element 60 of the embodiment of FIG. 3 is shown. The seal element 60 may, for example, be an off-the-shelf part. It is to be understood that other embodiments of seal elements may be implemented to complement the support ring 50 and to match the ball valve 42. Generally, the seal element 60 of FIGS. 6-7A in cross-section is a relatively thin-walled open-circular/semi-tubular piece 62 (having, for example, a 125° arc of the piece removed thus making it "open"). The embodiment of the seal element 60 shown in FIG. 6-7 is configured as a "C-shaped"

ring 64. Such "C-shaped" rings elements 64 are commercially available from several manufacturers (such as, for example, from Garlock and from American Seal) at reasonable cost.

Each of the support ring and the seal element embodiments can be made from materials better suited to match the respective individual functions of the support ring and the seal element considering the desired application. The skilled craftsman or artisan is thus allowed a wide variation of available materials to best match the service conditions or the individual application. For example, materials can be chosen that do not require hardening or custom lapping. More generally, the multiple component seat is referred to as a 'metal seat' because the support ring and the seal element (plus other and/or additional components) are more commonly made of metal. However other materials could be used as selected by the skilled craftsman. By way of example only, and in no means an exhaustive list, some of the materials which may be utilized include cast iron, stainless steel, nickel alloy and high performance or engineered ceramics. However whenever the term 'metal' is used herein with respect to the various embodiments described, it shall be understood to be inclusive of at least all of the foregoing material.

In the multiple component seat there may be additional components and/or there may be more that one support ring and more than one seal element. Accordingly, additional embodiments will be discussed below as representative examples of various individual applications and also to suggest the breadth of the variety of the applications, which is not intended to be limited to the several embodiments shown. However, in the minimalist embodiment, the multiple component seat 40 has one support ring 50 and one seal element 60.

Legacy valve designs do not have the same seal cross section as the valve size increases. The seat section dimensions increase with increasing size of the valve. This issue adds another layer of complexity to the metal seat design. It is typically desirable to maintain a constant seal cross section as the seal diameter is increased as an aid to manufacturability.

Figure 8:
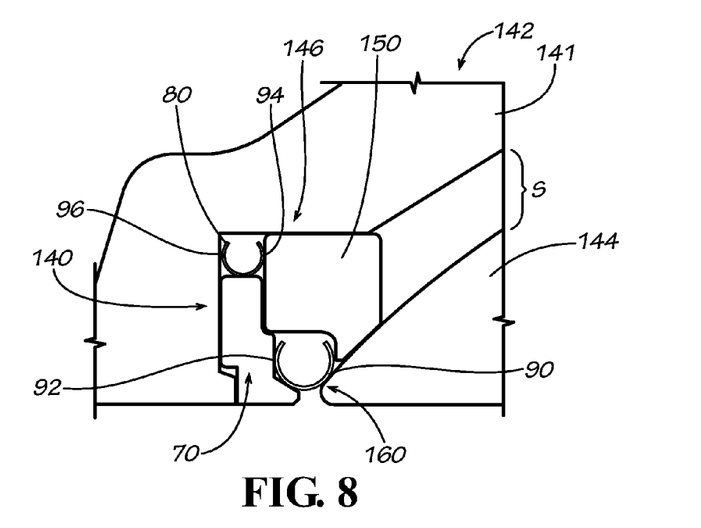
FIG. 8 is a sectional view of another embodiment of a multiple component seat in a metal seated floating ball valve.

The embodiment of the multiple component seat 140 shown in FIG. 8 spans the gap between body 141 and ball 144 with a relatively thin material. As the unsupported span "S" increases, the size of the metal seal needed to close the span "S" must also increase. Yet, even in this embodiment the cross-sectional area of the primary seal element 160 should be made as thin as possible to maintain resiliency and flexibility in the primary seal element 160. This cannot be done without practical limits. The seal must be strong enough to support itself across the span "S" without collapsing. So there are conflicting considerations which must be optimized by either trial and error or analysis to meet functional requirements for the valve 142. The minimalist embodiment (see FIG. 3) in which the multiple component seat 40 has one support ring 50 and one seal element 60 may not be optimal where the span "S" increases with increasing valve size.

In the embodiment shown in FIG. 8, when the span "S" defined between the ball 144 and valve body 141 is too large to use a single seal element, a spacer ring 70 is added to bridge the span "S". A smaller second seal element 80 can be implemented. The second seal element 80 is required to seal the leak paths created by adding the spacer ring 70. Other configurations are possible in this embodiment although the primary and secondary seal elements 160 & 80 must be oriented to seal along the various potential leak paths (points 90, 92, 94 & 96 in cross-section) where seals 160 & 80 are required. The embodiment or configuration shown allows the adjustment of interference of one seal without affecting the other. A pilot diameter centers the support ring 150 on the spacer ring 70 to maintain alignment with the seat pocket 146.

Figure 9:
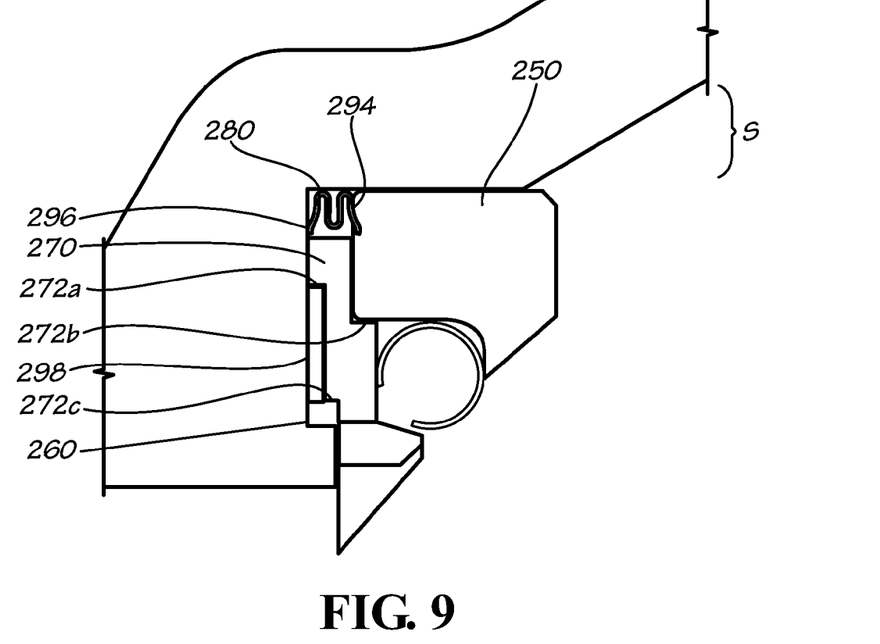
FIG. 9 is a sectional view of another embodiment of a multiple component seat in a metal seated floating ball valve.

In another embodiment shown in FIG. 9, a support ring 250, primary seal element 260 and a spacer 270 having various dog-legs 272a, b & c is shown. A wave spring 298 (sinusoidal-like) may be used to fit the tight annular space, and to provide mechanical energy to "push" the spacer 270 against the primary seal element 260. A secondary seal element or spring 280 appearing as a commercially available spring from, for example, Garlock Helicoflex sold under the brand name "E-FLEX" or from American Seal (such seal element 280 which may be referred to herein as a "metal E-ring" or an "E-ring") may be implemented to seal along other potential leak paths 294 & 296.

Figure 10:
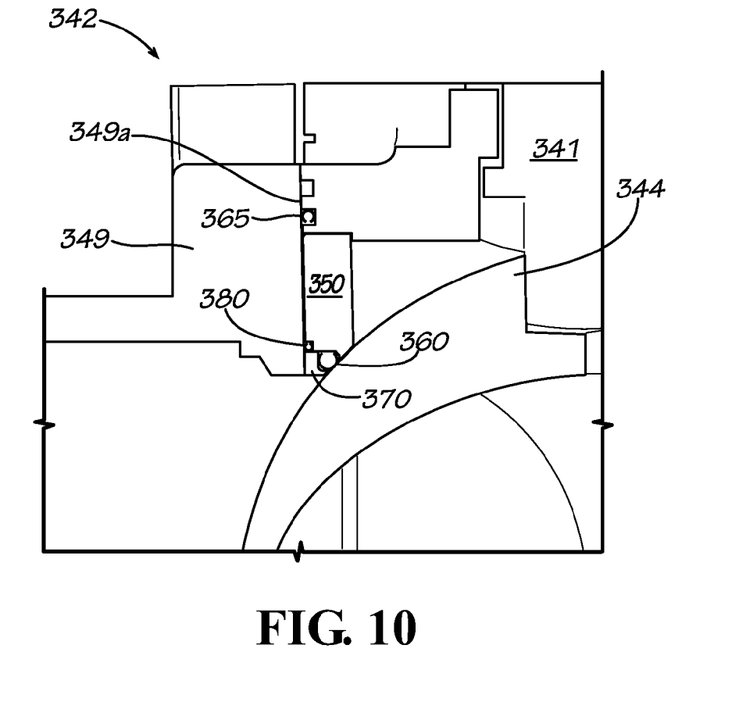
FIG. 10 is a sectional view of another embodiment of a multiple component seat in a metal seated floating ball valve.

In the embodiment shown in FIG. 10, a three piece ball valve 342 is shown having a valve body 341, a ball 344 and an end cap 349. In this embodiment a relatively larger support ring 350, seal element 360 and a spacer 370 is shown. A smaller back seat spring 380 is also implemented. The end cap interface 349a includes a third spring element 365 to seal the potential leak path along the end cap 349.

Figure 14:
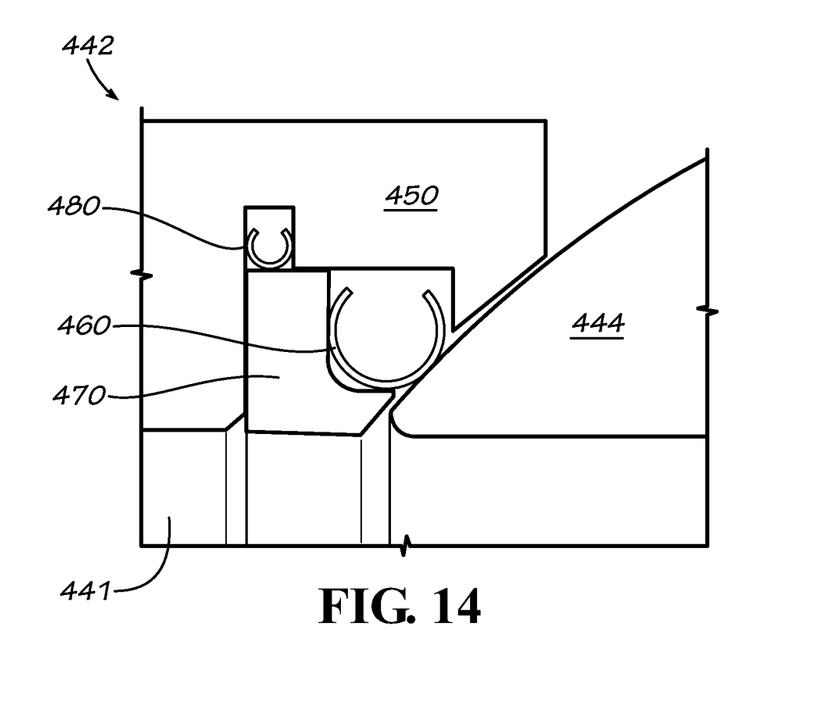
FIG. 14 is a sectional view of another embodiment of a multiple component seat in a metal seated floating ball valve.

In the embodiment shown in FIG. 14, a ball valve 442 is shown having a valve body 441 and a ball 444. In this embodiment a relatively larger support ring 450, seal element 460 and a spacer 470 is shown. A smaller back seat seal/spring 480 is also implemented.

Figure 15:
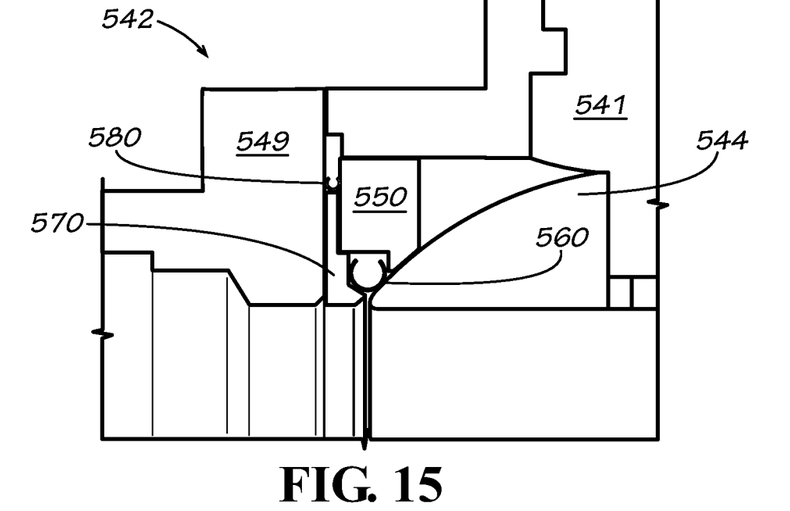
FIG. 15 is a sectional view of another embodiment of a multiple component seat in a metal seated floating ball valve.

In the embodiment shown in FIG. 15, a three piece ball valve 542 is shown having a valve body 541, a ball 544 and an end cap 549. In this embodiment a relatively larger support ring 550, seal element 560 and a spacer 570 is shown. A smaller back seat seal/spring 580 is also implemented.

Figure 16:
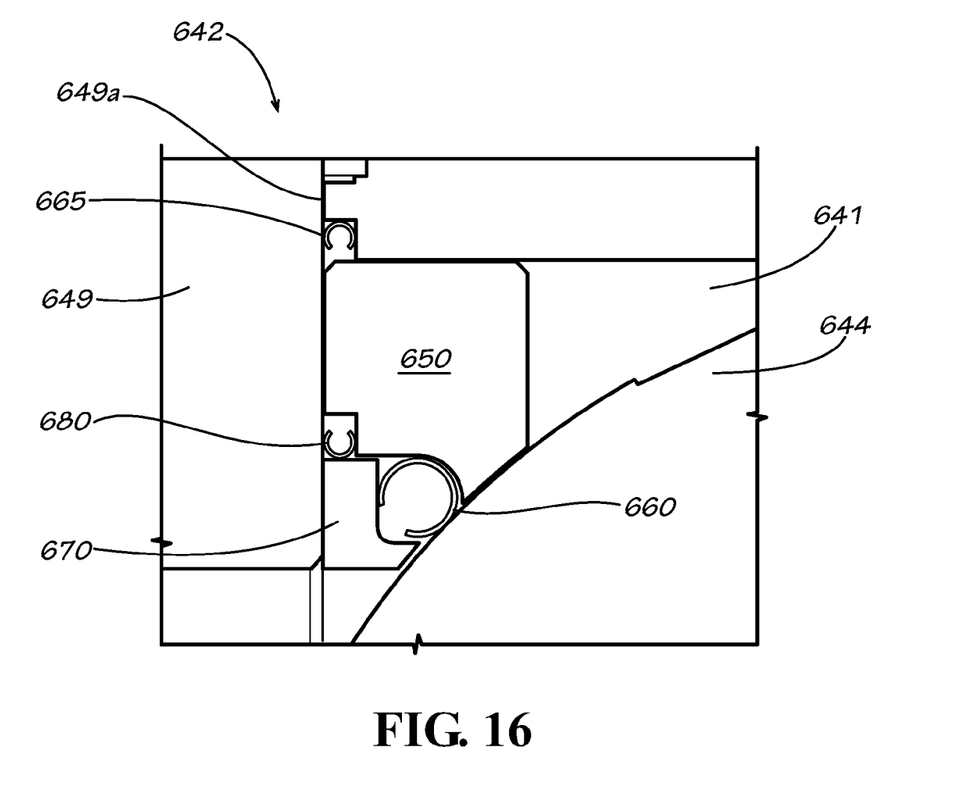
FIG. 16 is a sectional view of another embodiment of a multiple component seat in a metal seated floating ball valve.

In the embodiment shown in FIG. 16, a three piece ball valve 642 is shown having a valve body 641, a ball 644 and an end cap 649. In this embodiment a relatively larger support ring 650, seal element 660 and a spacer 670 is shown. A smaller back seat seal/spring 680 is also implemented. The end cap interface 649a includes a third spring element 665 to seal the potential leak path along the end cap 649.

Figure 11:
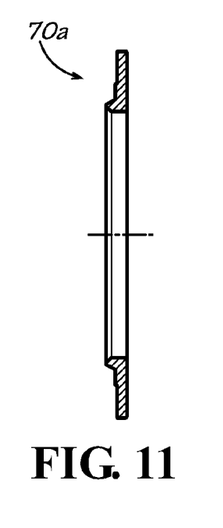
FIG. 11 is a cross-sectional view of one embodiment of a spacer ring.
Figure 11A:
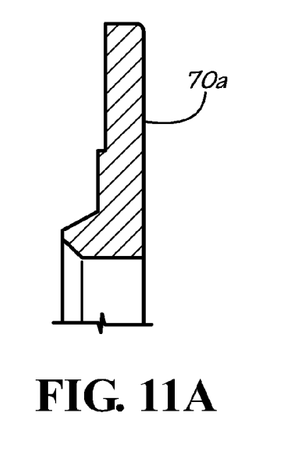
FIG. 11A is a detail break-away view taken from FIG. 11.
Figure 12:
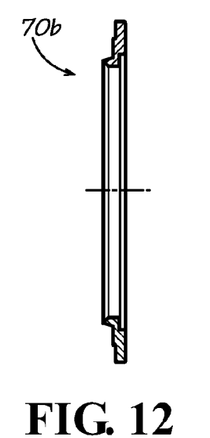
FIG. 12 is a cross-sectional view of another embodiment of a spacer ring.
Figure 12A:
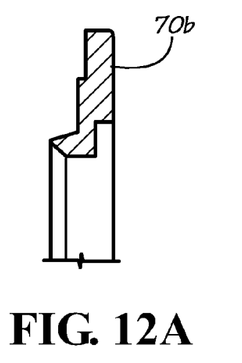
FIG. 12A is a detail break-away view taken from FIG. 12.

Other support ring, seal element and spacer configurations/embodiments are possible as needed to accomplish the specific design goals of a particular ball valve. By way of example, but by no means limiting, FIGS. 11-11A show one embodiment of a spacer ring 70a which may be incorporated into a particular specific design for a multiple component seat 40. FIGS. 12-12B show another embodiment of a spacer ring 70b which may be incorporated into another particular specific design. The skilled artisan will recognize that many different designs are possible dependent upon the chambers that are desired to be defined for the addition of a seal as dictated by other variables such as the valve body and chamber including the span "S".

In a floating ball valve, normally two of the multiple component seats will be retrofitted into the valve (one each inserted at each respective end of the valve chamber). In such an arrangement and due to the design of the various embodiments of the multiple component seat, the floating ball valve will accomplish the status of and effectively be formed as a two-way flow valve.

Figure 13:
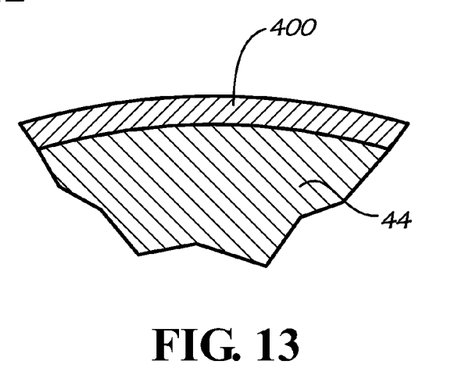
FIG. 13 represents a cross-sectional layer of a coating applied to a component such as a ball in the ball valve.

Referring to FIG. 13 layer(s) of coating 400 may be applied to the ball 44 and other components as described below to reduce friction and improve the wear characteristics. This is critical to the reasonable life expectancy of the ball valve 42 and dependent upon the parameters of the individual application. Hence, layers of coatings may be applied to the ball 44, the support ring 50, the seal element 60 and/or to the multiple component seat 40, in general, depending upon the specific application. By way of example only, and not intended to be limiting, since one of ordinary skill in the art will realize that many coatings are available and that various applications may call for different considerations as to applicable coatings. Examples of coatings, but by no means an exhaustive list, includes generally nitrides of titanium, silicon, tungsten, chrome, boron or iron; carbides of same; and oxides of Aluminum. One of ordinary skill in the art can select a suitable coating as needed for a metal-to-metal seal depending upon the specific application or design.

The multiple component seat does not require custom modifications to the valve body including the seat pocket. Neither does it require the custom lapping of precision parts to achieve reliable sealing in a ball valve. As the span of the gap varies across valve body and ball size ranges, spacer rings may be added to close the gap such that seals having a more desirable cross-sectional area may be implemented. It is to be understood that larger section seals could be created to span the larger gaps in a multiple component seat but this would result in tradeoffs to seal manufacturability, performance and/or life expectancy.

The invention claimed is:

1. An apparatus for insertion into a seal pocket of a ball valve having a ball within a valve body, comprising:
   a multiple component seat for insertion into the seat pocket;
   wherein the multiple component seat is made of metal;
   wherein the multiple component seat comprises a support ring and a seal element;
   wherein the support ring and the seal element are juxtaposed;
   wherein both the support ring and the seal element abut the ball when the multiple component seat is installed and the ball valve is in a closed position;
   wherein the seal element has a greater elasticity as compared to the support ring;
   wherein the support ring directly supports a pressure load of the ball in part and has a greater load bearing strength as compared to the seal element; and
   wherein the multiple component seat further comprises a spacer ring and a secondary seal element;
   wherein the spacer ring and the secondary seal element are juxtaposed;
   wherein the secondary seal element and the support ring are juxtaposed;
   wherein the spacer and the secondary seal element are made of metal; and
   a wave spring abutting and configured to push the spacer ring against the seal element.

2. The apparatus according to claim 1 wherein the support ring is in an overlapping complimentary position with respect to the seal element.

3. The apparatus according to claim 1 wherein the support ring comprises a brace for the seal element.

4. The apparatus according to claim 1 wherein the seal element is a mechanical compression spring.

5. The apparatus according to claim 4 wherein the seal element is "C"-shaped in cross section.

6. The apparatus according to claim 5 wherein the multiple component seat further includes a secondary seal element comprising an E-ring.

7. The apparatus according to claim 1 wherein the support ring comprises a counter-bored annular piece; and a chamfered edge located along a side in which the support ring would abut the ball of the ball valve.

8. The apparatus according to claim 7 wherein the chamfered edge is a conical surface.

9. The apparatus according to claim 7 wherein the chamfered edge is a spherical surface.

10. The apparatus according to claim 7 wherein the chamfered edge is a toroidal surface.

11. The apparatus according to claim 1 wherein at least one component selected from the group of components consisting of the ball, the multiple component seat, the support ring and the seal element includes a layer of a coating.

12. The apparatus according to claim 1 wherein a chamfered edge of the support ring is proximal to a centerline of the ball valve when the multiple component seat is installed in the ball valve; and wherein a surface of the seal element that is adapted to abut the ball of the ball valve when the multiple component seat is installed in the ball valve, is distal to the centerline of the ball valve.

13. The apparatus according to claim 1 wherein the ball valve is a floating ball valve.

14. An apparatus for insertion into a seal pocket of a floating ball valve having a ball within a valve body, comprising:
   a multiple component seat for insertion into the seat pocket;
   wherein the multiple component seat is made of metal;
   wherein the multiple component seat comprises a support ring and a seal element;
   wherein the support ring and the seal element are juxtaposed;
   wherein both the support ring and the seal element abut the ball when the multiple component seat is installed and the floating ball valve is in a closed position;
   wherein the support ring is in an overlapping complimentary position with respect to the seal element;
   wherein the seal element has a greater elasticity as compared to the support ring; and
   wherein the support ring directly supports a pressure load of the ball in part and has a greater load bearing strength as compared to the seal element; and
   wherein the multiple component seat further comprises a spacer ring and a secondary seal element;
   wherein the spacer ring and the secondary seal element are juxtaposed;
   wherein the secondary seal element and the support ring are juxtaposed;
   wherein the spacer and the secondary seal element are made of metal; and
   a wave spring abutting and configured to push the spacer ring against the seal element.

15. The apparatus according to claim 14 wherein the support ring comprises a counter-bored annular piece; and a chamfered edge located along a side in which the support ring would abut the ball of the floating ball valve.

* * * * *